United States Patent [19]

Shimizu et al.

[11] Patent Number: 4,535,281
[45] Date of Patent: Aug. 13, 1985

[54] AUTOMATIC VOLTAGE REGULATING SYSTEM FOR ELECTRIC GENERATOR

[75] Inventors: Motohiro Shimizu, Asaka; Shigeru Fujii, Sayama, both of Japan

[73] Assignee: Honda Giken Kogyo Kabushiki Kaisha, Tokyo, Japan

[21] Appl. No.: 550,673

[22] Filed: Nov. 10, 1983

[30] Foreign Application Priority Data

Nov. 10, 1982 [JP] Japan ................. 57/197139

[51] Int. Cl.³ ............................ H02P 9/30; H02P 9/14
[52] U.S. Cl. ........................................ 322/28; 322/58; 322/59
[58] Field of Search ............... 322/28, 58, 59; 320/64, 320/68

[56] References Cited

U.S. PATENT DOCUMENTS 4,035,713  7/1977  Kawamoto et al. ................. 322/28
4,128,799 12/1978  Morishima ........................... 322/28
4,340,849  7/1982  Kuhn ................................... 322/28

Primary Examiner—R. J. Hickey
Attorney, Agent, or Firm—Armstrong, Nikaido, Marmelstein & Kubovcik

[57] ABSTRACT

The present invention is directed to an automatic voltage regulating system for an electric generator comprising a detection coil for detecting the output voltage of an AC generator. The voltage regulating system includes a detection circuit comprising a rectifying circuit for rectifying the output voltage of the detection coil, a smoothing circuit coupled to the detection circuit for smoothing the output voltage and a regulating circuit coupled to the output of the smoothing circuit for shifting the voltage load thereof, wherein the regulating circuit shifts the level of the voltage in the smoothing circuit by comparing the voltage in the rectifying circuit with the predetermined voltage to control the field current during the period of the shifting of the voltage level.

18 Claims, 7 Drawing Figures

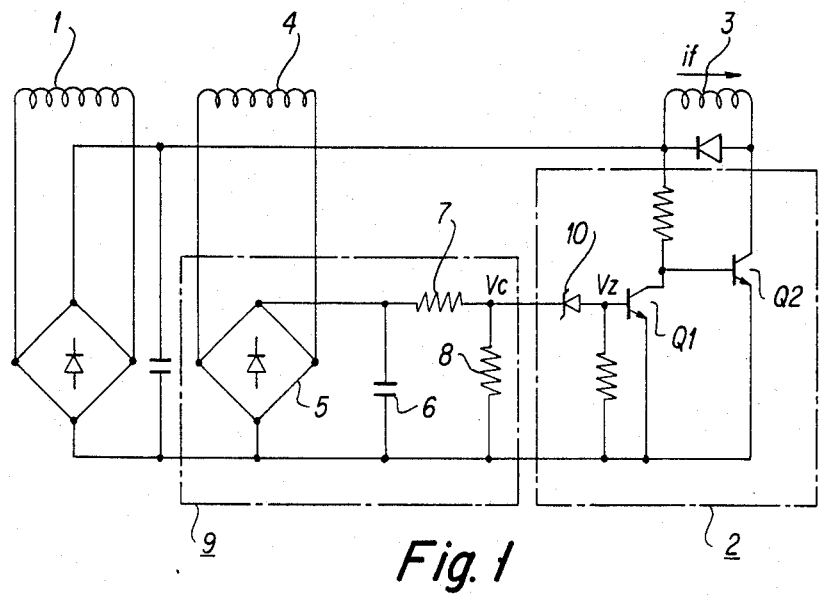
Fig. 1
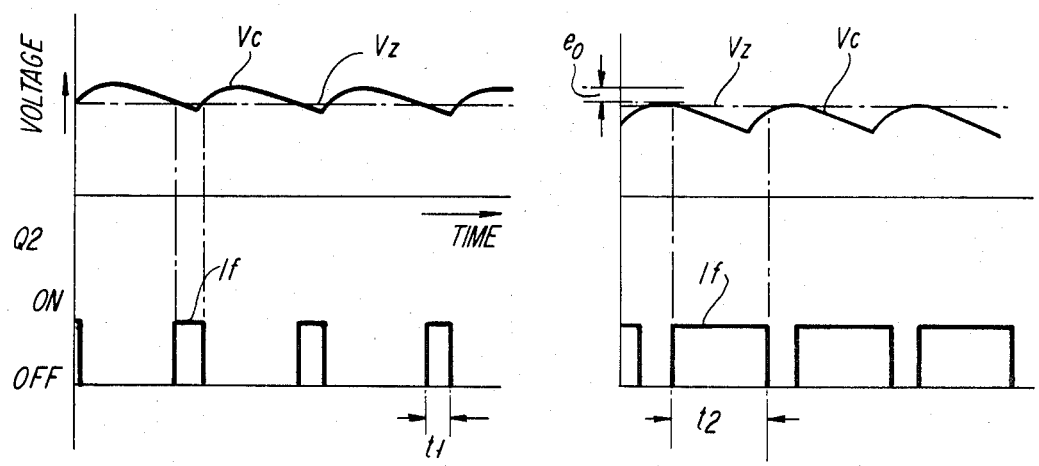
Fig. 2(a)
PRIOR ART
Fig. 2(b)
PRIOR ART

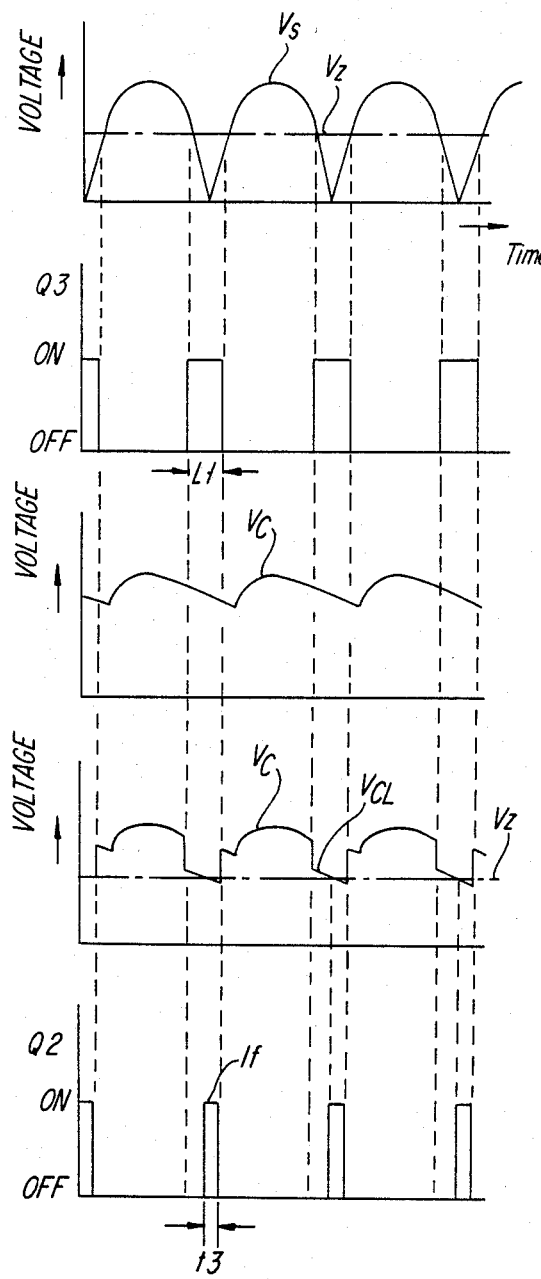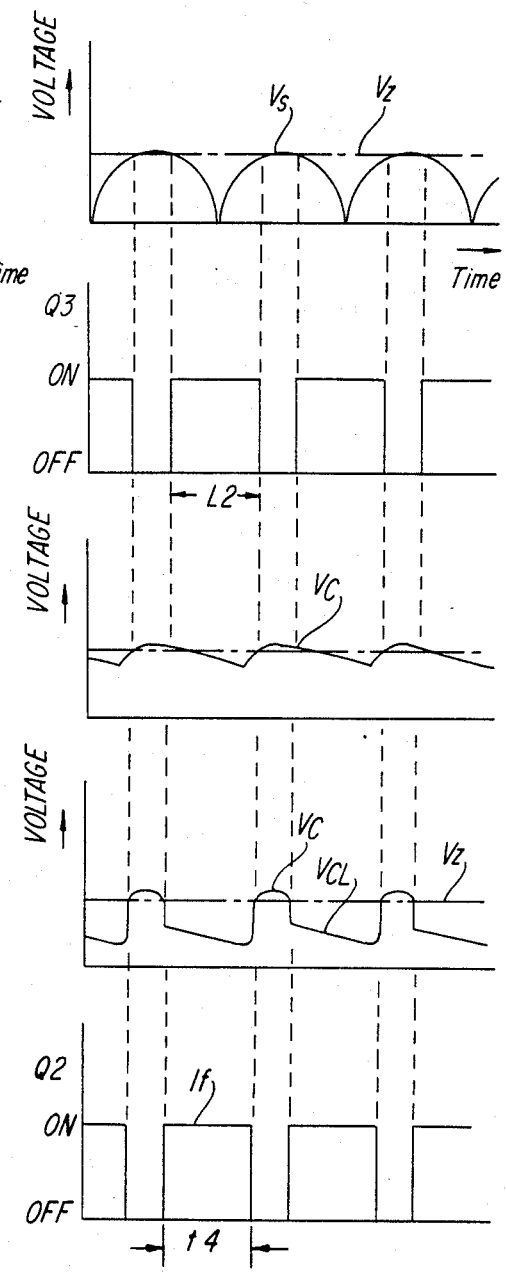

AUTOMATIC VOLTAGE REGULATING SYSTEM FOR ELECTRIC GENERATOR

BACKGROUND OF THE INVENTION

1. Field of the Invention

The present invention is directed to a voltage regulating system for an electric generator and more particularly, to a voltage regulating system for an electric generator which suppresses an increase in field current when the number of revolutions of the generator is small such as when the generator is overloaded or during initial start up.

2. Description of the Prior Art

In an electric generator driven by an internal combustion engine, the output voltage is usually stabilized by feedback control of the field current supplied to the field coil of the generator, the feedback control being based on the output voltage of the generator. Thus, output voltage can be maintained at a prescribed level by allowing the field current to increase as the load increases. In an automatic voltage regulator of this type, however, if the generator is operated at low speed to avoid wasteful power operation of the engine as a driving source during a period of small loading or unloading, for instance, the automatic votage regulating function still operates and the field current supplied to the fiedl coil will unnecessarily increase. As a result, this not only causes the load for the field coil to increase but also increase the torque of the generator, and thus, the torque load of the engine as a driving source is uselessly increased.

As shown in FIG. 1, an automatic voltage regulator has been known which operates to supply the output current of an exciting coil 1 of a genrator to a field coil 3 through a control circuit 2. In this automatic voltage regulator, the output voltage of the generator is detected as a pulse voltage by a detection circuit 9 comprising a detection coil 4, a fullwave rectifier 5, a capacitor 6 and resistors 7 and 8. The voltage Vc obtained by dividing the pulse voltage with the resistors 7, 8 is compared with the Zener voltage of a Zener diode 10. A transistor Q1 in a control circuit 2 is turned OFF when Vc<Vz and a transistor Q2 connected thereto, to form a Darlingtion pair is turned ON, so that the output current of the exciting coil 1 is supplied to the field coil 3 as a field current "if".

In other words, the field current $i_f$ is controlled by comparing the voltage Vc obtained by dividing the pulse voltage in the detection circuit 9, which varies upwardly and downwardly according to the variation of the output voltage of the generator with respect to the Zener voltage Vz. When a load connected to the generator is small, the driving torque of the generator is small because, as shown in FIG. 2(a), the section Vc<Vz is narrow and the field current if supplied to the field coil 3 is small. However, the driving torque of the generator becomes large as the number of revolutions decreases with the load being increased, because the field current if supplied to the field coil 3 is increased, since the level of Vc drops as shown in FIG. 2(b), thus, making the section Vc<Vz wider.

Accordingly, in this control system, it is necessary to enlarge the strength of recovery by increasing the energizing ratio t2/t1 of the field current which is a function of eo, the range of variation of Vc, so as to reduce the voltage regulation of the output voltage of the generator.

However, the arrangement shown in FIG. 1 makes the driving torque of the generator extremely large because a large field current if is being supplied to the field coil 3 until the generator gains (or recovers) the number of revolutions within normal operation when the generator is operated at relatively low speed as in an overload condition or during a starting operation. Consequently, a driving source with an output large enough to provide this large torque load value, or an engine with a large output is required for an engine-driven generator.

To lower the output of a driving source, it will be necessary to increase the voltage regulation by making a smaller energizing ratio t2/t1 for the field current which is a function of eo, the range of variation of the voltage Vc.

SUMMARY OF THE INVENTION

An object of the present invention is to provide an automatic voltage regulating system for an electric generator, wherein the driving torque is so controlled that it is prevented from becoming too large by reducing the voltage regulation during a period of normal range of opertion, as in the case of rated operation, and suppressing an increase in field current when the number of revolutions is small as in the case of an overload operation.

Another object of this present invention is to provide an automatic voltage regulating system for an electric generator, wherein when a large load such as initial current of an electric motor is connected to the generator, causing the output voltage to be temporarily reduced, and sufficient starting current is supplied to the load while an increase of the field current is temporarily allowed.

The present invention is directed to an automatic voltage regulating system for an electric generator comprising a detection coil for detecting the output voltage of an AC generator. The generator has a field coil and an exciting coil for supplying a field current to the field coil. A detection circuit rectifies and smooths the output voltage of the detector coil to form a pulse voltage therefrom and a control circuit is coupled to the detection circuit for comparing the pulse voltage to a predetermined voltage and for controlling the supply of field current to the field coil as a function of the comparison. The detection circuit includes a rectifying circuit for rectifying the output voltage of the detection coil, a smoothing circuit coupled to the detection circuit for smoothing the output voltage and a regulating circuit coupled to the output of the smoothing circuit for shifting the voltage load thereof, wherein the regulating circuit shifts the level of the voltage in the smoothing circuit by comparing the voltage in the rectifying circuit with the predetermined voltage ot control the field current during the period of the shifting of the voltage level.

BRIEF DESCRITPTION OF THE DRAWINGS

FIG. 1 is a prior art automatic voltage regulating circuit.

FIGS. 2A and 2B are characteristic curves of the output voltage of the generator and the field current of the prior art circuit shown in FIG. 1.

FIGS. 4 and 5 are characteristic curves of various voltages and field current of the voltage regulating system of the present invention under different operating conditions.

DETAILED DESCRIPTION OF THE PREFERRED EMBODIMENT

Figure 3:
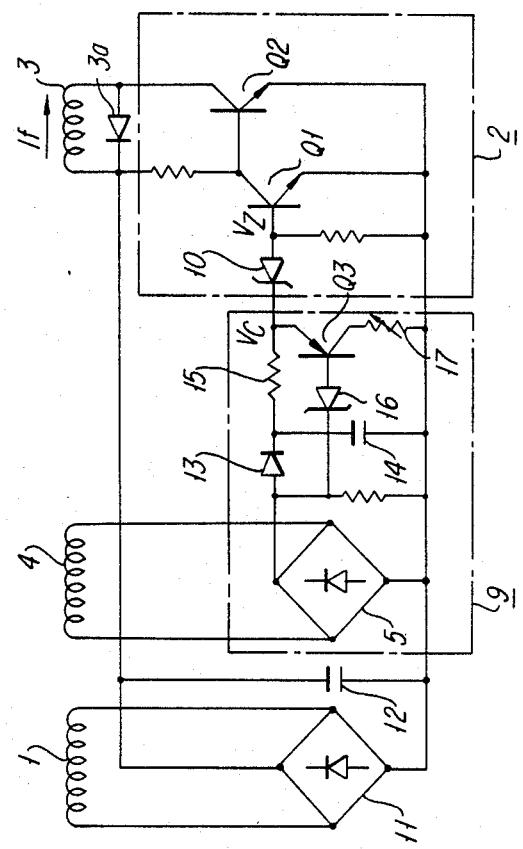
FIG. 3 is a circuit diagram of a voltage regulating system of a preferred embodiment of the present invention.

In FIG. 3, an electric generator (not shown) has an exciting coil 1. A fullwave rectifier 11 and a smoothing capacitor 12 rectify and smooth the output voltage of the exciting coil 1 and are arranged so that the field current if, which is rectified and smoothed, is supplied to a field coil 3 through a conrol circuit 2. A flywheel diode 3a is connection in parallel with the field coil 3.

A detection coil 4 detects the output voltage of the generator and a fullwave rectifier 5 forms a rectifier circuit for the output of the detection circuit 4. A capacitor 14 and a resistor 15 form a smoothing circuit and the rectifier circuit 5 is connected to the smoothing circuit through a diode 13.

A transistor Q3 is included in a regulating circuit 9 to downwardly shift the level of the pulse voltage in the smoothing circuit. When a p-n-p type transistor is employed as in the case of the preferred embodiment, the voltage in the rectifier circuit can be compared with Zener voltage Vz by connecting the emitter of transistor Q3 to the cathode of a Zener diode 10 and the base of transistor Q3 to the rectifier circuit. A diode 16 protects the base of the transistor Q3 and a resistor 17 regulates the collector current of the transistor Q3.

A detection circuit 9 comprises the rectifier circuit formed with the fullwave rectifier 5 for rectifying the output voltage of the detection coil 4. The smoothing circuit is formed with the capacitor 14 and the resistor 15 for smoothing the output voltage, and the diode 13 is connected across the rectifier circuit and the smoothing circuit. The transistor Q3 shifts the pulse down in the smoothing circuit by comparing the voltage in the rectifying circuit and the Zener voltage Vz of the Zener diode 10. The diode 16 protects the base of the transistor Q3, and the resistor 17 regulates the collector current.

The Zener diode 10 sets the operating level of the control circuit 2, the diode being connected so that it turns ON the transistor Q3 when the voltage Vc in the smoothing circuit exceeds the Zener voltage Vz.

The transistor Q2 is connected to the transistor Q1 to form a Darlington pair and transistor Q2 is turned ON when transistor Q1 is turned OFF so as to supply the field current if to the field coil 3.

The operation of the circuit of FIG. 3 will be described by reference to FIGS. 4 and 5. Since the voltage drop of a semiconductor in the forward direction least affects the operation, it is assumed negligible in this description.

The voltage Vs formed by fullwave rectification in the rectifier 5 and the Zener voltage Vz are compared by the transistor Q3 and, when Vs<Vz, the transistor Q3 turns ON and shifts down the pulse voltage Vc within a period L1 when it is ON.

The amount of shifting is set by the regulator resistor 17 in such a manner that the voltage VcL, which a portion of the pulse voltage Vc, indicating the slope characteristic within the section L1, equals the Zener voltage Vz when the number of revolutions is within the normal operating range as when the generator is in its rated operation.

Consequently, when the number of revolutions of the generator is within the normal operating range, the voltage VcL is compared with the Zener voltage Vz, and the transistor Q2 is turned ON which permits the supply of field current if to the field coil 3.

In other words, during the period t3 of energization of the field coil, the field current if is controlled along the gentle slope characteristic of the voltage Vc=VcL within the period L1 where the transistor Q3 is held ON, so that stabilized voltage control is effected with small voltage regulation.

On the contrary, FIG. 5 shows the operation when the generator is subjected to an overload operation or in a starting operation where the number of revolutions is reduced.

In this case, the overall level of the pulse voltage Vc is lowered because the number of revolutions is small. The transistor Q3 is held ON within the period Vs<Vz in this condition and, since the level of the pulse voltage Vc within the section 12 shifted down, the shifted voltage VcL is lower than the Zener voltage Vz.

Accordingly, the period Vc<Vz corresponding to the period t4 of the field current if is limited by the period L2 when the transistor Q3 is ON and thus, not allowed to extend further.

In other words, even if the range of variation el of the pulse voltage Vc is wide because the number of revolutions of the generator is reduced, the maximum increase in field current if is limited by the period L2 when the transistor Q3 is ON. Consequently, it becomes possible to suppress the increase in driving torque of the generator to a large extent by decreasing the energizing ratio t4/t3.

Thus, the supply of the field curent if is regulated by comparing VcL<Vz within the period in which the level of the pulse voltage Vc is shifted and crosses the Zener voltage Vz. The maximum increase in field current if is limited by the range of the level shifting section. As a result, an increase in the driving torque at a reduced number of revolutions can be suppressed without increasing the voltage regulation within the normal range of use.

Figure 6:
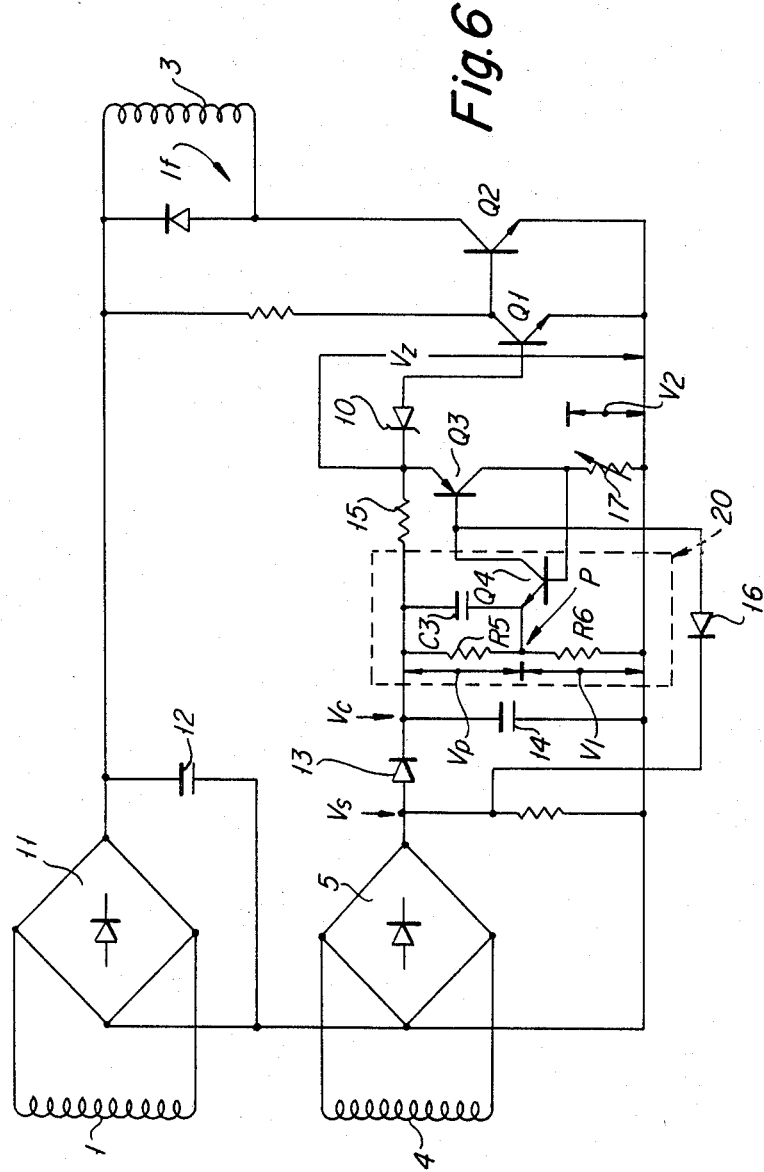
FIG. 6 is a schematic diagram of an alternative embodiment of the present invention.

As noted above, the increasing ratio of the average period of energization of the field current if is limited. According to another preferred embodiment of the present invention, the restricting operation is temporarily suspended by a time limit circuit 20 as shown in FIG. 6. The time limit circuit 20 comprises resistors R5, R6, a capacitor C3 and a transistor Q4. The resistors R5, R6 constitutes a divider circuit with the capacitor C3 charged with a divided voltage Vp in the divider circuit. The charge end discharge time constant of the capacitor C3 is set sufficiently larger than that of the smoothing capacitor 14 in the first embodiment. Moreover, the transistor Q4 is controlled so as to become conductive as a function of the difference between the voltage V1 at the voltage dividing point P in the dividier circuit and the voltage V2 across the ends of the resistor R2 in the regulating circuit. Transistor Q4 is connected to the transistor Q3 so as to conduct (ON) when (V2>V1) and to drive the transistor Q3 in the regulating circuit, to become conductive. However, the difference (V2−V1) is preset by the resistors 6 and 17 so that it becomes (V2−V1)≦0 at a preset time period.

If the output voltage of the generator is temporarily substantially reduced because of the connection of a heavy load such as the initial current of an electric motor, the detection voltage Vs, pulse voltage Vc and so on will also be greatly reduced. However, the voltage across the terminals of the capacitor C3 will not decrease instantaneously because of the discharge time constant of the capacitor C3. Rather, the voltage across capacitor C3 will decrease with a predetermined time lag. For this reason, the difference (V2−V1) is temporarily reversed and a period in which (V2−V1)>0 occurs. Due to this, the transitor Q3 in the regulating circuit operates in the initial stage of output voltage reduction and causes the level of the pulse voltage Vc in the smoothing circuit to shift down, so that the section of Vc<Vz extends for a certain time, allowing the field current if to increase.

When an electric motor with a large initial current is connected to a load, it is possible to supply the necessary starting current only by releasing the restriction of the field current if. As a result, the load is allowed to quickly move to a steady operating state. By the time the load moves to the steady state operating state, the difference (V2−V1) returns to the steady state (V2−V1)≦0; thus, the restrictive operation by means of the field current if is again restored. For instance, when the output voltage continuously decreases because the generator is operated at low speed, an unnecessary increase in the driving torque can be prevented by limiting the increase in the field current. The driving torque of the generator also temporarily increases even when the field current if temporarily increases because of the time limit circuit. However, the increase in the driving torque at this time, because it is for an extremely short time that the initial current of a motor, for instance, flows, gives almost no work load to the engine as a driving source of the generator. Accordingly, it is unnecessary to replace the engine as a driving source with one that has larger power output.

Although it is so arranged that the field current if is supplied to the field coil 3 when Vc<Bz, it is also possible to supply the field current if even when Vc>Vz by partially changing the detection circuit 9 to invert signal processing.

As above described, the torque load of a driving source, such as an engine, can be reduced according to the present invention by preventing an increase in wasteful field current when an electric generator is being operated at low speed and sufficient starting current can be supplied to a heavy load such an initial current of, for instance, an electric motor.

The present invention may be embodied in other specific forms without departing from the spirit or essential characteristics thereof. The presently disclosd embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An automatic voltage regulating system for an electric generator comprising a detection coil for detecting the output voltage of an AC generator; said generator having a field coil and an exciting coil for supplying a field current to said field coil; a detection circuit means for rectifying and smoothing the output voltage of the detection coil to form a pulse voltage therefrom; and a control circuit means coupled to said detection circuit means, for comparing the pulse voltage to a predetermined voltage and for controlling the supply of field current to said field coil as a function of the comparison; said detection circuit means including a rectifying circuit means for rectifying the output voltage of said detection coil, a smoothing circuit means, coupled thereto, for smoothing the output voltage, and regulating circuit means coupled to the output of said smoothing circuit means for shifting the voltage level thereof, wherein said regulating circuit means shifts the level of the voltage in said smoothing circuit means by comparing the voltage in said rectifying circuit means with the predetermined voltage to control the field current during the period of the shifting of the voltage level.

2. An automatic voltage regulating system for an electric generator as claimed in claim 1, including a diode connected across said rectifying circuit means and said smoothing circuit means.

3. An automatic voltage regulating system for an electric generator as claimed in claim 1, wherein said regulating circuit means downwardly shifts the level of the voltage in said smoothing circuit means.

4. An automatic voltage regulating system for an electric generator as claimed in claim 1, wherein said rectifying circuit means comprises a fullwave rectifier.

5. An automatic voltage regulating system for an electric generator as claimed in claim 1, wherein said smoothing circuit means forms a pulse output.

6. An automatic voltage regulating system for an electric generator as claimed in claim 1, including a Zener diode for providing the predetermined voltage.

7. An automatic voltage regulating system for an electric generator as claimed in claim 3, wherein said regulating circuit means performs the level shifting operation when the output voltage of the rectifying circuit means is lower than the predetermined voltage.

8. An automatic voltage regulating system for an electric generator as claimed in claim 6, wherein the regulating circuit means compares the voltage at the cathode of the Zener diode with the voltage at the anode of the Zener diode, the voltage at the cathode being the predetermined voltage and the voltage at the anode being the output of said control circuit means.

9. An automatic voltage regulating system for an electric generator comprising a detection coil for detecting the output voltage of an AC generator having a field coil and an exciting coil for supplying a field current to said field coil; a detecting circuit means for rectifying and smoothing the output voltage of the detection coil and forming a pulse voltage therefrom; and a control circuit means, coupled to said detection circuit means, for comparing the pulse voltage to a predetermined voltage and for controlling the supply of field current to said field coil as a function of the comparison, said detection circuit means including a rectifying circuit means for rectifying the output voltage of said detection coil, a smoothing circuit means, coupled thereto, for smoothing the output voltage, a regulating circuit means coupled to the output of said smoothing circuit means for shifting the voltage level thereof, and time limit circuit means, coupled to said regulating circuit means, for limiting the operation of said regulating circuit means to a predetermined period of time, wherein said regulating circuit means shifts the level of the voltage in said smoothing circuit means by comparing the voltage in said rectifying circuit means with the predetermined voltage to control the field current within the level shifting, during the predetermined time period, and wherein the level of the voltage in said smoothing circuit means is shifted to cause an increase in field current regardless of the result of the comparison of the output of said rectifying means with the predetermined voltage when the output of said generator drops.

10. An automatic voltage regulating system for an electric generator as claimed in claim 9, including a diode connected across said rectifying circuit means and said smoothing circuit means.

11. An automatic voltage regulating system for an electric generator as claimed in claim 9, wherein said regulating circuit means downwardly shifts the level of the voltage in the smoothing circuit means.

12. An automatic voltage regulating system for an electric generator as claimed in claim 9, wherein said rectifying circuit means comprises a fullwave rectifier.

13. An automatic voltage regulating system for an electric generator as claimed in claim 9, wherein said smoothing circuit means forms a pulse output.

14. An automatic voltage regulating system for an electric generator as claimed in claim 9, including a Zener diode for providing the predetermined voltage.

15. An automatic voltage regulating system for an electric generator as claimed in claim 11, wherein said regulating circuit means performs the level shifting operation when the output voltage of the rectifying circuit means is lower than the predetermined voltage.

16. An automatic voltage regulating system for an electric generator as claimed in claim 15, wherein the regulating circuit means compares the voltage at the cathode of the Zener diode with the voltage at the anode of the Zener diode, the voltage at the cathode being the predetermined voltage and the voltage at the anode being the output of said control circuit means.

17. An automatic voltage regulating system for an electric generator as claimed in claim 9, wherein said time limit circuit means shifts the level of the voltage of said smoothing circuit means when the output voltage of said AC generator is lowered.

18. An automatic voltage regulating system for an electric generator as claimed in claim 9, wherein the time constant circuit means includes first and second series connected resistors, and a capacitor connected across the first of said resistors, and wherein the predetermined time period is the period during which the voltage across the second of said resistors is less than the output voltage of said regulating circuit means.

* * * * *